United States Patent
Takács et al.

(10) Patent No.: US 9,325,623 B2
(45) Date of Patent: *Apr. 26, 2016

(54) SYSTEM AND METHOD OF AUTOMATICALLY CONFIGURING I-SIDS IN GMPLS CONTROLLED ETHERNET PROVIDER BACKBONE BRIDGED NETWORKS

(71) Applicant: TELEFONAKTIEBOLAGET L M ERICSSON (PUBL), Stockholm (SE)

(72) Inventors: Attila Takács, San Jose, CA (US); András Kern, Budapest (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/319,486

(22) Filed: Jun. 30, 2014

(65) Prior Publication Data
US 2014/0313899 A1    Oct. 23, 2014

Related U.S. Application Data

(63) Continuation of application No. 12/920,183, filed as application No. PCT/IB2009/000358 on Feb. 26, 2009, now Pat. No. 8,842,667.

(60) Provisional application No. 61/033,553, filed on Mar. 4, 2008.

(51) Int. Cl.
*H04L 12/56* (2006.01)
*H04L 12/803* (2013.01)
(Continued)

(52) U.S. Cl.
CPC ............ *H04L 47/125* (2013.01); *H04L 12/462* (2013.01); *H04L 45/50* (2013.01);
(Continued)

(58) Field of Classification Search
CPC ........................................................ H04L 12/56
USPC ................................................... 370/389, 401
See application file for complete search history.

(56) References Cited

U.S. PATENT DOCUMENTS

| 8,416,790 B1* | 4/2013 | Busch et al. ................. 370/401 |
| 2007/0086455 A1* | 4/2007 | Allan et al. .................. 370/389 |
| 2007/0141986 A1* | 6/2007 | Kuehnel et al. .............. 455/41.2 |

FOREIGN PATENT DOCUMENTS

WO    WO 2007/051300 A1    5/2007

OTHER PUBLICATIONS

Kou Kikuta et al. An Experiment for GMPLS Controlled Gigabit Wide Area Ethernet. Technical Report of IEICE, the Institute of Electronics, Information and Communication Engineers. Dec. 13, 2007, vol. 107, No. 404, pp. 13-17.

(Continued)

*Primary Examiner* — Wanda Z Russell (57) ABSTRACT

A system and method of automatically configuring a Service Instance Identifier (I-SID) in a Generalized Multiprotocol Label Switching (GMPLS) controlled network. The method begins by identifying a specific I-SID for a specific service in the GMPLS controlled network. Next, the identified I-SID is automatically configured within a Backbone Edge Bridge (BEB) with a Resource Reservation Protocol-Traffic Engineering (RSVP-TE) extension. The automatic configuration may be implemented by several different embodiments. In one embodiment, the I-SID may be carried in a SESSION_ATTRIBUTE object. In another embodiment, the I-SID may be mapped to a Short Call ID field in a Session object. Alternatively, the I-SID may be carried in an Endpoint ID Type-Length-Value (TLV). The I-SID may also be carried in a new TLV in a LSP_ATTRIBUTES or CALL_ATTRIBUTES object.

8 Claims, 8 Drawing Sheets

(51) Int. Cl.
*H04L 12/46* (2006.01)
*H04L 12/723* (2013.01)

(52) U.S. Cl.
CPC ... *H04L 45/502* (2013.01); *H04Q 2213/13109* (2013.01); *H04Q 2213/13204* (2013.01); *H04Q 2213/13216* (2013.01); *H04Q 2213/13348* (2013.01); *H04Q 2213/13389* (2013.01)

(56) References Cited

OTHER PUBLICATIONS

Ishii, D. et al. An Experiment of Controlling Gigabit Wide Area Ethernet by GMPLS Supporting Layer-2 Switching Capability. Optical Fiber Communication/National Fiber Optic Engineers Conference 2008. OFC/NFOEC 2008. Conference on, vol. No. pp. 1-3, Feb. 24-28, 2008.

RFC 4974, Aug. 2007.

Green H., et al. "Carrier Ethernet: The 1-34 native approach" Internet Citation Jan. 1, 2007, pp. 84-89, XP002526013 ISSN; 0014-0171 Retrieved from the Internet: URL http://www.ericsson.com/ericsson/corpinfo/publications/review/2007_03/files/3_CarrierEthernet.pdf>.

Papadimitriou (Alcatel) N Sprecher (Siemens) J Cho (ETRI) L Andersson (ACREO AB) Dfedyk Det al: "Label Encoding Solution Decoder and Analysis for GMPLS—controlled Ethernet Label Switching (GELS); draft-dimitri-gels-soution-eval-00.txt" IETF Standard-Working-Draft, Internet Engineering Task Force, IETF, CH Feb. 1, 2006, XP015043396.

Papadimitriou, et al., Generalized MPLS (GMPLS) RSVP-TE Signaling Extensions in Support of Calls, RFC 4974, Aug. 1, 2007, 32 pages.

* cited by examiner

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Setup Prio  | Holding Prio  |     Flags     |  Name Length  |
+-+-+-+-+-+-+-+-+-+-+-+-+-+-+-+-+-+-+-+-+-+-+-+-+-+-+-+-+-+-+-+-+
|                                                               |
//     Session Name          (NULL padded display string)      //
|                                                               |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type (TBA)  |       Length (variable)      |
+-+-+-+-+-+-+-+-+-+-+-+-+-+-+-+-+-+-+-+-+-+-+-+-+-+-+-+-+-+-+-+-+
|                         Endpoint ID                           |
~                                                               ~
|                                                               |
+-+-+-+-+-+-+-+-+-+-+-+-+-+-+-+-+-+-+-+-+-+-+-+-+-+-+-+-+-+-+-+-+
```

SYSTEM AND METHOD OF AUTOMATICALLY CONFIGURING I-SIDS IN GMPLS CONTROLLED ETHERNET PROVIDER BACKBONE BRIDGED NETWORKS

CROSS-REFERENCE TO RELATED APPLICATIONS

This application is a continuation of co-pending U.S. patent application Ser. No. 12/920,183, filed Aug. 30, 2010, which was the National Stage of International Application No. PCT/IB09/00358, filed Feb. 26, 2009, which claims the benefit of U.S. Application No. 61/033,553, filed Mar. 4, 2008, the disclosures of which are incorporated herein by reference.

TECHNICAL FIELD

The present invention relates generally to communications networks, and in particular, to a system and method providing automatic Service Instance Identifier (I-SID) configurations for Generalized Multiprotocol Label Switching (GMPLS) Controlled Ethernet Provider Backbone Bridged Networks.

BACKGROUND

The Institute of Electrical and Electronics Engineers (IEEE) is amending Ethernet standards to equip Ethernet with new features required for Wide Area Network (WAN) deployment. The relevant extensions include: Connectivity Fault Management (CFM); Provider Bridging (PB); Provider Backbone Bridging (PBB); and Provider Backbone Bridging-Traffic Engineering (PBB-TE).

PB and PBB are enhancing Ethernet scalability. With PB, a new Virtual Local Area Network (VLAN) tag, the Service VLAN (S-VALN) tag, has been introduced to allow providers to use a separate VLAN space while transparently maintaining the Customer VLAN (C-VLAN) information.

PBB allows a full separation of the customer and provider address spaces by encapsulating customer frames adding a "backbone" MAC header. This enables both the MAC addresses and the whole VLAN space to be in control of the provider. The fields of the encapsulation header for the "Backbone" MAC header include Backbone Destination Address (B-DA), Backbone Source Address (B-SA) and Backbone VLAN (B-VLAN). In addition to the "backbone" MAC header, a new tag, the Service Instance Tag (I-TAG) is added when customer frames are encapsulated. The I-TAG has a 24-bit Service Instance Identifier (I-SID) field. The I-SID unambiguously identifies customer services. In PBB, edge bridges, such as Backbone Edge Bridges (BEBs), which process customer frames and add the backbone MAC header, and the I-SID can be distinguished from core bridges, such as Backbone Core Bridges (BCBs), which are forwarding frames based on the backbone MAC header.

PBB-TE decouples the Ethernet data and control planes by explicitly supporting external control/management mechanisms to configure static filtering entries in bridges and creating explicitly routed connections. In addition, PBB-TE defines mechanisms for 1:1 protection switching of bidirectional Ethernet connections.

In the Internet Engineering Task Force (IETF), the Generalized Multiprotocol Label Switching (GMPLS) controlled Ethernet Label Switching (GELS) is extending the GMPLS control plane for PBB-TE Ethernet networks. GMPLS established PBB-TE connections are referred to as Ethernet Label Switched Paths (LSPs). GELS enables the application of Multiprotocol Label Switching-Traffic Engineering (MPLS-TE) and GMPLS provisioning and recovery features in Ethernet networks.

In PBB, the I-SID identifies a service instance. However, there is currently no mechanism in GMPLS to provide this information.

SUMMARY

In PBB networks, the I-SID identifies a specific service. The I-SID must be configured at the BEBs interfacing with the customer. To ease network management and avoid misconfiguration by manual setup of the I-SID in each BEB, a control plane mechanism is needed to provide I-SID configuration. In a GMPLS controlled Ethernet network, the present invention provides extensions to the Resource Reservation Protocol-Traffic Engineering (RSVP-TE protocol) to provide the I-SID configuration.

Thus, in one embodiment, the present invention is directed to a method of automatically configuring an I-SID in a GMPLS network. The method begins by identifying a specific I-SID for a specific service in the GMPLS controlled network. Next, the identified I-SID is automatically configured within a Backbone Edge Bridge (BEB) with a Resource Reservation Protocol-Traffic Engineering (RSVP-TE) extension. The automatic configuration may be implemented by several different embodiments. In one embodiment, the I-SID may be carried in a SESSION_ATTRIBUTE object. In another embodiment, the I-SID may be mapped to a Short Call ID field in a Session object. Alternatively, the I-SID may be carried in an Endpoint ID Type-Length-Value (TLV). The I-SID may also be carried in a new TLV in a LSP_ATTRIBUTES or CALL_ATTRIBUTES object In another embodiment, the present invention is directed to a system for automatically configuring an I-SID in a GMPLS controlled network. The system includes a BEB in the GMPLS network. The system identifies a specific I-SID for a specific service in the GMPLS controlled network and automatically configures the identified I-SID within a BEB with a RSVP-TE extension.

In still another embodiment, the present invention is directed to a node for automatically configuring an I-SID in a GMPLS controlled network. The node identifies a specific I-SID for a specific service in the GMPLS controlled network and automatically configures the identified I-SID within a BEB with a RSVP-TE extension.

DETAILED DESCRIPTION

Figure 1:
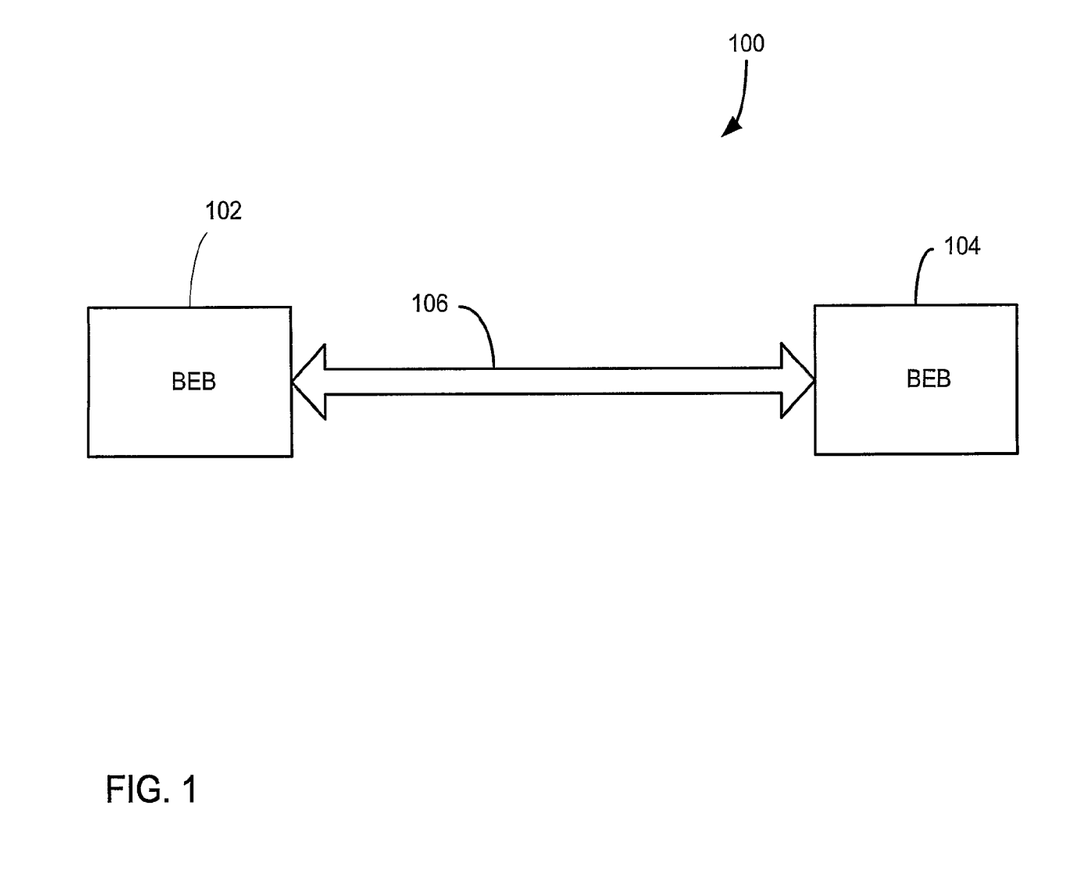
FIG. 1 is a simplified block diagram illustrating elements of a PBB network.

The present invention is a system and method providing automatic I-SID configurations for Generalized Multiprotocol Label Switching (GMPLS) Controlled Ethernet Provider Backbone Bridged Networks. FIG. 1 is a simplified block diagram illustrating elements of a PBB network 100 according to the teachings of the present invention. The network includes a first BEB 102 communicating with a second BEB 104 through one or more Ethernet Switched Paths (ESPs) 106.

In "Generalized MPLS (GMPLS) Support for Metro Ethernet Forum and G.8011 User-Network Interface (UNI)", Internal Draft and "Generalized MPLS (GMPLS) Support for Metro Ethernet Forum and G.8011 Ethernet Services", Resource Reservation Protocol-Traffic Engineering (RSVP-TE) extensions are defined to support a UNI. It is proposed in these documents to use a Call construct and a new Type-Length-Value (TLV), i.e., the Endpoint ID TLV in the LSP_ATTRIBUTES object, to establish and identify a specific Ethernet service. However, these extensions do not address utilizing and configuring the I-SID.

Figure 2:
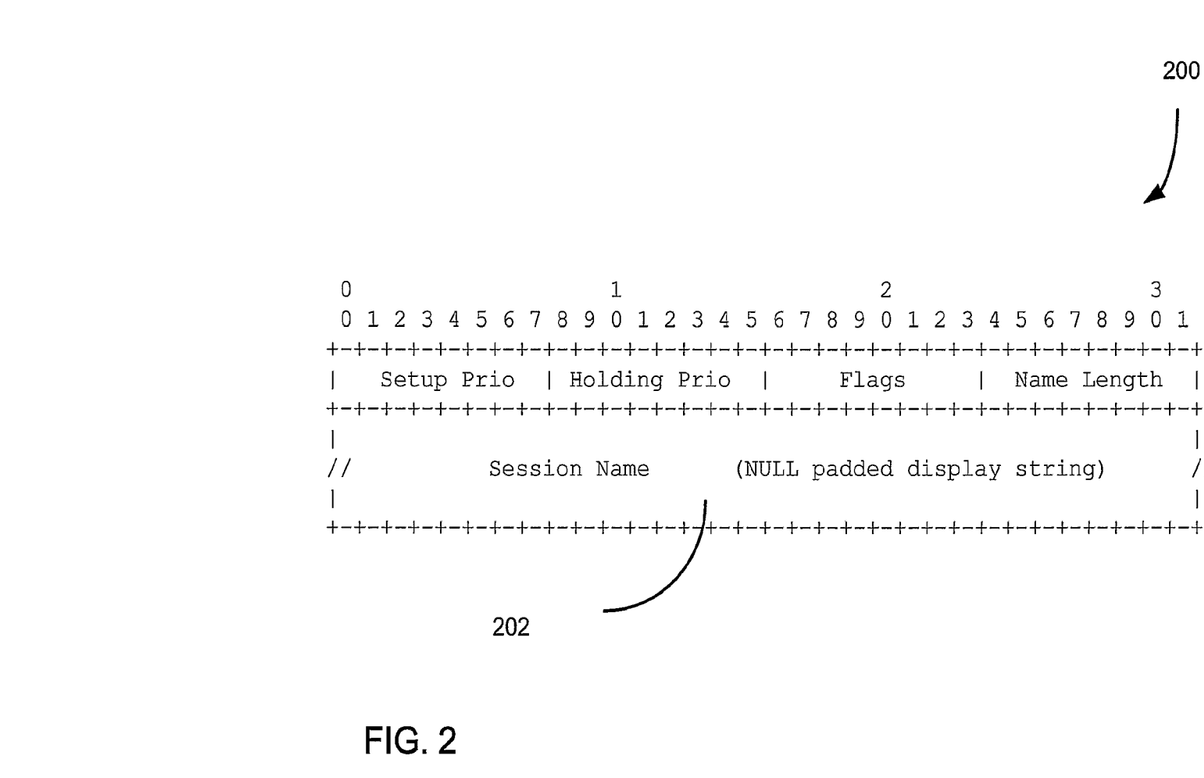
FIG. 2 illustrates a format of a session attribute object having a Session name in a one embodiment of the present invention.

The present invention provides a system and method for automatically configuring I-SIDs in GMPLS networks. The present invention provides several embodiments for automatically configuring the I-SIDs. In one embodiment, the present invention utilizes a SESSION_ATTRIBUTE object to signal the I-SID. The Session Name field of the SESSION_ATTRIBUTE Object carries a Null padded display string. In the case the Session Name is used as a notify message to establish a call, this field is interpreted as the Long Call ID. The purpose of the I-SID is similar to the Call ID, and as such may be encoded in the Session Name field. FIG. 2 illustrates a format of a session attribute object 200 having a Session name 202. The I-SID may be either encoded as a numeric value or converted to a character string. The field Name Length is typically fixed to 4 and 8, respectively. Alternatively, the Session Name may contain readable text and the I-SID value may be appended to that text surrounded by control characters. This way, a meaningful text as well as the I-SID value may be carried in this field.

Figure 3:
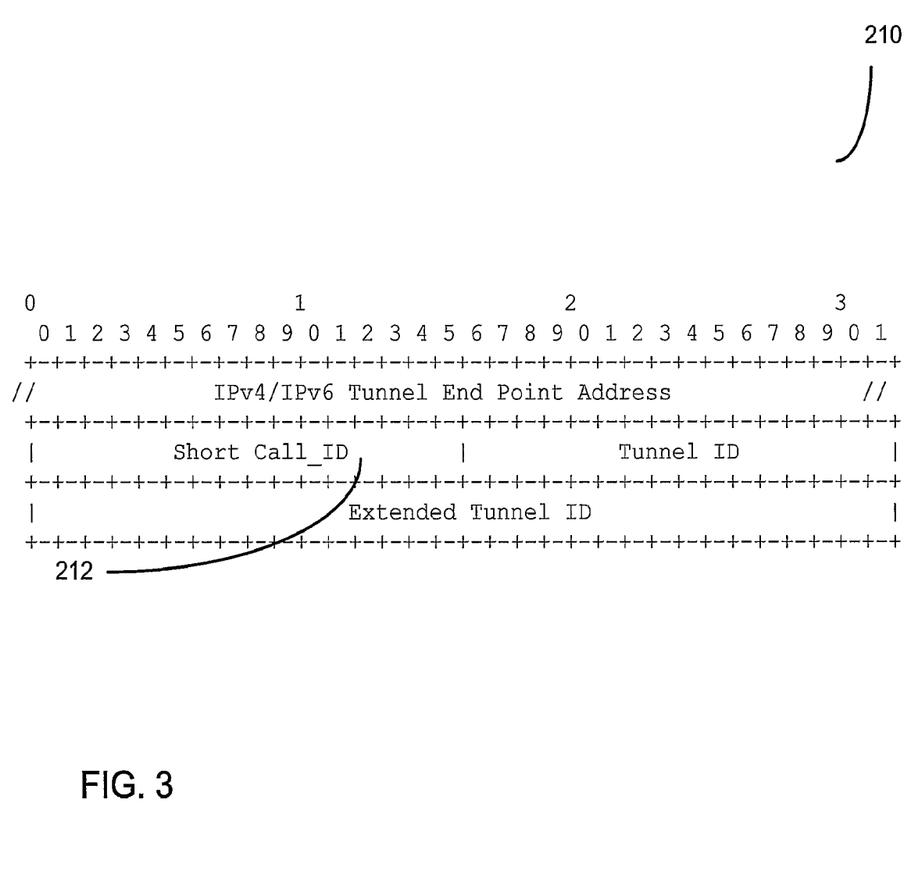
FIG. 3 illustrates a format of the SESSION object carrying a short call ID in a second embodiment of the present invention.

In another embodiment, the I-SID may be mapped to a short call ID. FIG. 3 illustrates a format of the SESSION object 210 carrying a short call ID 212. The Short Call ID is carried in a 16 bit field in the SESSION object 210. It identifies all LSPs setup to support a given Call. Since the I-SID is a 24 bit field, it may only be carried in the Short Call ID if a proper "compressed" encoding is utilized. This requires some management mechanisms to pre-allocate I-SID ranges to edge bridges. However, this pre-allocation may ensure that no I-SID collision occurs during signaling.

Figure 4:
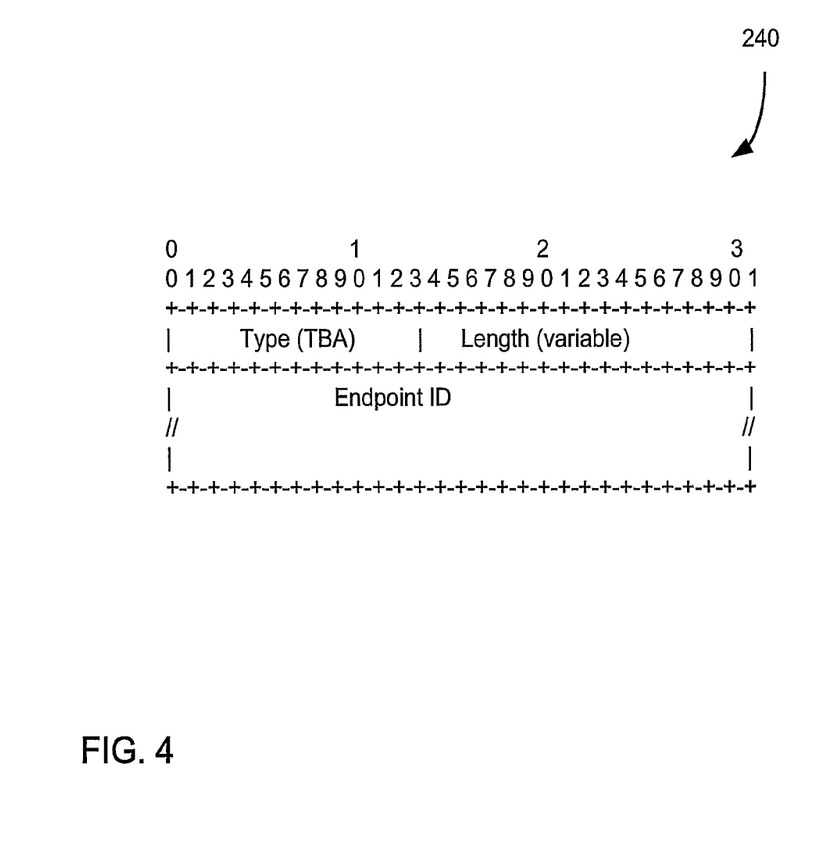
FIG. 4 illustrates a format of an endpoint ID TLV.
Figure 5:
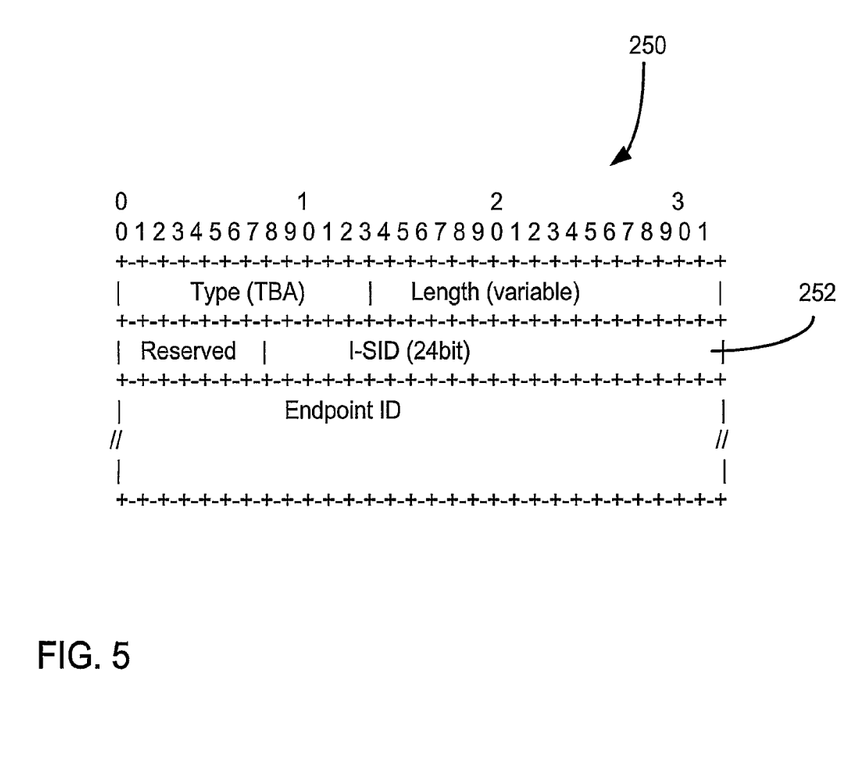
FIG. 5 illustrates a configuration of a possible extension of the endpoint ID TLV in a third embodiment of the present invention.

In another embodiment, the I-SID may be carried in an Endpoint ID Type-Length-Value (TLV). FIG. 4 illustrates a format of an endpoint ID TLV 240. In a similar fashion as the Session Name field in the SESSION_ATTRIBUTE object, the Endpoint ID is a null padded variable length object. However, the Endpoint ID TLV may be extended with a new field to carry the I-SID. FIG. 5 illustrates a configuration of a possible extension of the endpoint ID TLV 250 according to the teachings of the present invention. As depicted in FIG. 5, a new I-SID field 252 is provided in the endpoint ID TLV.

Figure 6:
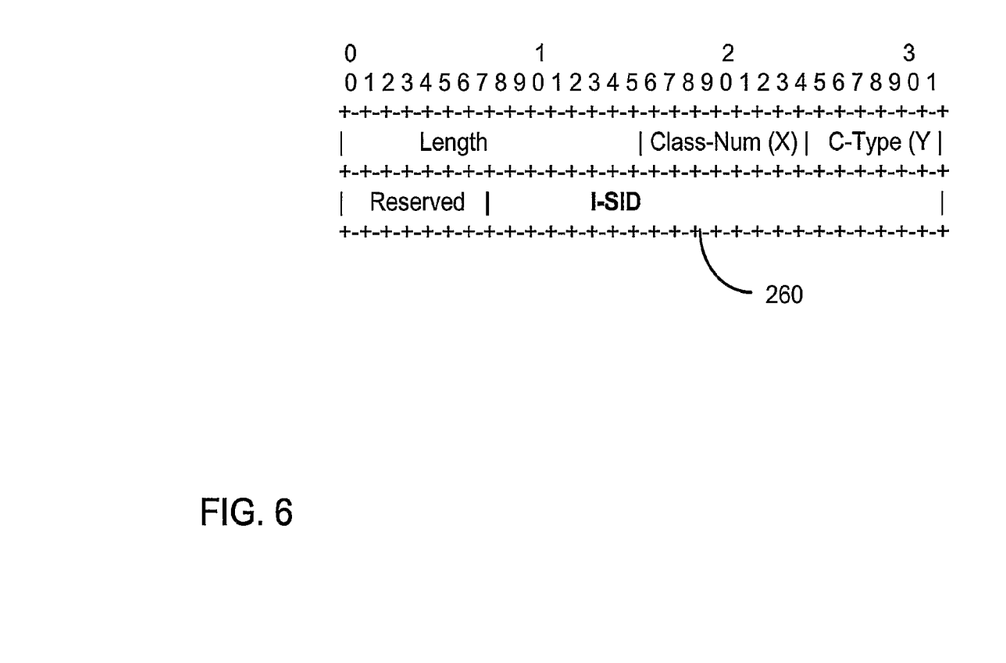
FIG. 6 illustrates a format of a configuration of an I-SID TLV carried in the LSP_ATTRIBUTES or CALL_ATTRIBUTE object in a fourth embodiment of the present invention.

In still another embodiment, a new Ethernet specific TLV may be introduced in the LSP_ATTRIBUTES or CALL_ATTRIBUTES Object to carry the I-SID. FIG. 6 illustrates a format of a configuration of an I-SID TLV 260 carried in the LSP_ATTRIBUTES according to the teachings of the present invention.

Session Name and Endpoint ID fields, as discussed in FIGS. 2 and 4, were originally defined to transmit displayable identifiers for management purposes even, when the signaling is automated. Therefore, to transmit the I-SID, the I-SID must be concatenated to the original string.

Using the short Call ID, as discussed in FIG. 3, to transmit the low 16 bits of the I-SID provides the simplest solution. However, this method may only be used if a Call is associated to each service. In addition, 1-to-1 assignment between the 24 bit I-SID and the 16 bit Short Call ID is essential.

Creating a new TLV to transmit the I-SID, as discussed in FIG. 6, provides the most general solution. This embodiment is applicable even if no Call is associated to a particular service.

The embodiment discussed in FIG. 3 has a crucial issue. Specifically, only 16 bits are available to encode the I-SID in the Short Call ID field, since the I-SID is 24 bits. To accommodate the I-SID in this abbreviated 16 bit field, the present invention may map the I-SID to the 16 bits field. In one embodiment, to avoid I-SID collision, the I-SID space is split into multiple non-overlapping domains, where each domain is dedicated to a single BEB. The I-SID may be logically divided into the Originator BEB ID and the Service Differentiator. The originator BEB ID can be either disseminated in advance using the routing protocol (OSPF-TE/ISIS-TE), carried in RSVP-TE, or be configured by management.

The I-SID may be split to Originator BEB IDs and Service differentiator fields using different ratios. For example, 8 bits for BEB ID and 16 bits for Service differentiation may be used in one embodiment. In another embodiment, 12 bits for BEB IDs and 12 bits for Service Differentiation may be used. In the first case, there can be $2^8=256$ BEBs and up to $2^{16}$~65 k service instances initiated by each BEB. In the second case, up to 4096 BEBs can be differentiated. However, only 4096 service instances can be initiated by a BEB.

The Router ID is a 32 bit identifier assigned to every node in a GMPLS controlled network. At the same time, the Router IDs are routable control plane IP addresses. Thus, the router IDs may be treated as regular IP address.

Figure 7:
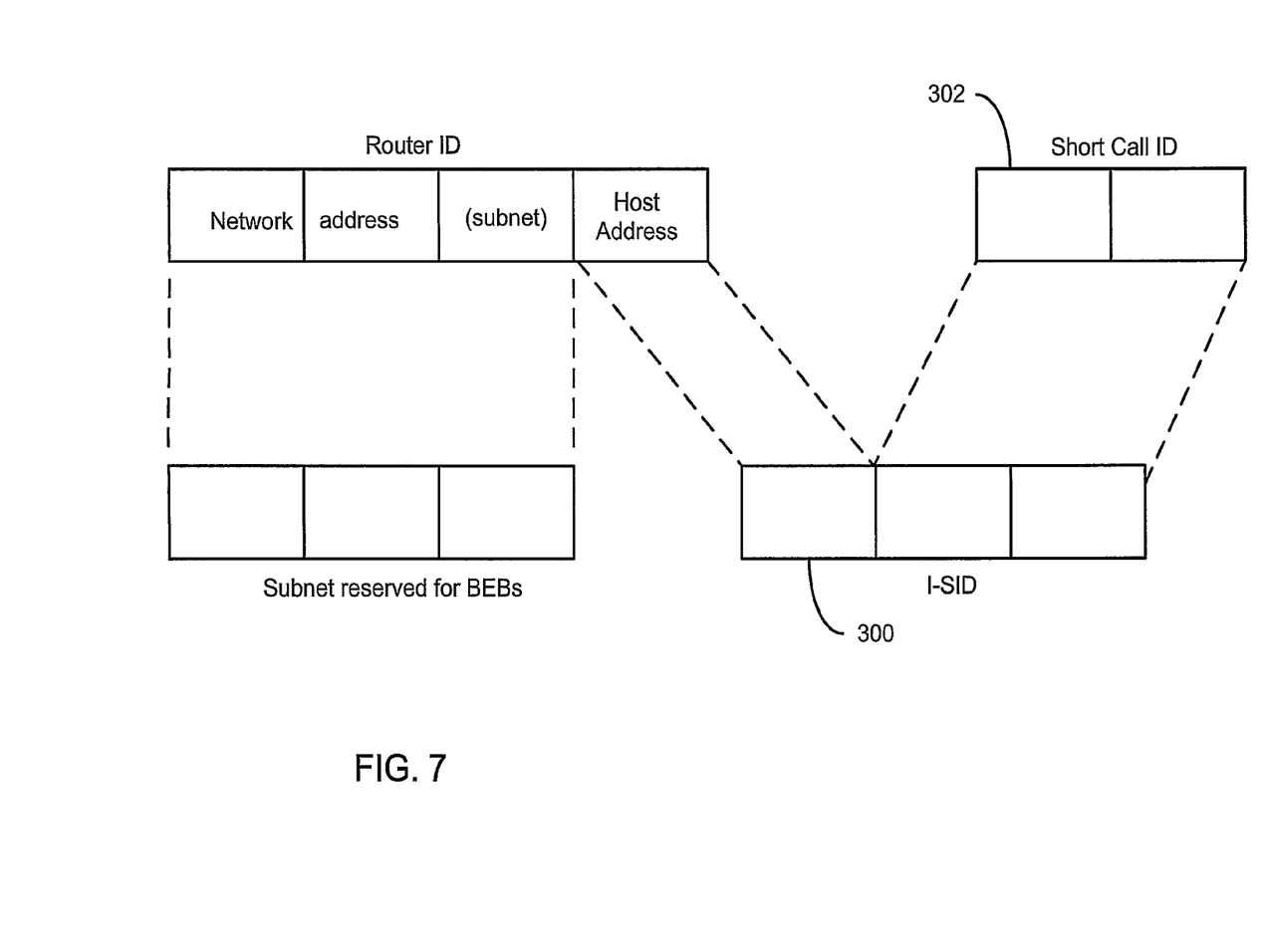
FIG. 7 illustrates a 1-to-1 mapping scheme between an I-SID and short call IDs.

The Originator BEB ID may be derived from the Router ID of the source node. In the present invention, the lowest 8 bits of the Router ID may be interpreted as the BEB ID. This embodiment requires that the lowest 8 bits of the Router IDs of the BEBs must uniquely identify BEBs. The I-SID (24 bits) is then the concatenation of the lowest 8 bit of the Router ID and the Short Call ID. FIG. 7 illustrates a 1-to-1 mapping scheme between an I-SID 300 and short call IDs 302. Thus, the Originator BEB ID (8 bits) allows unique identification of 256 edge bridges. The Service Differentiator is 16 bits.

To ensure the uniqueness of the BEB IDs, several assumptions are made. Specifically, the control plane of a PBB-TE network is assumed to consist of a single IP network domain. Thus, the Network address portion is common. Since the host address must be unique within the control plane, the host address is assumed to be unique for the PBB-TE domain as well. This mapping scheme may be used only if the network address is 24 bit long.

If the network address is longer than 24 bits, some of its bits must be used as well. However, in general, their uniqueness cannot be ensured. If it is shorter than 24 bits, the lowest 8 bits of the host address will not be unique.

To fix these address spacing problems, a subnet may be preserved only for the BEBs that extend the network address to 24 bits. The other subnets may be used for the other nodes.

Figure 8:
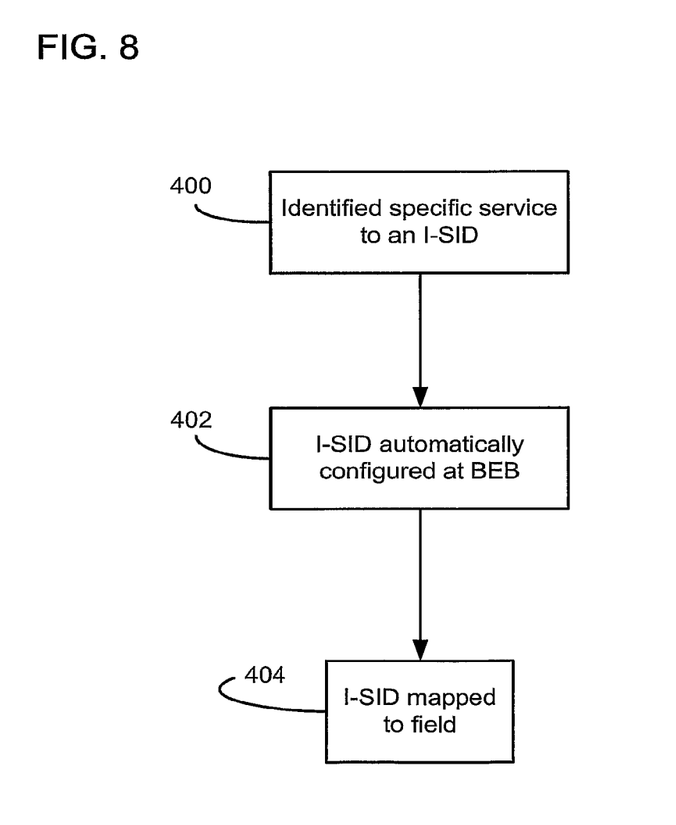
FIG. 8 is a flow chart illustrating the method of automatically configuring an I-SID within a GMPLS controlled network according to the teachings of the present invention.

FIG. 8 is a flow chart illustrating the method of automatically configuring an I-SID within a GMPLS network according to the teachings of the present invention. With reference to FIGS. 1-8, the present invention will now be explained. The method begins in step 400 where a specific I-SID identifies a specific service in the PBB network 100. Next, in step 402, the I-SID is automatically configured at the BEB interfacing with a subscriber. Within the GMPLS controlled Ethernet network, extensions are utilized in the RSVP-TE protocol. To configure the I-SID, the present invention may utilize several different embodiments discussed above. The present invention may use the Session Name field of the SESSION_ATTRIBUTE Object. In another embodiment, the I-SID may be mapped to the Short Call ID. In still another embodiment, the I-SID may be carried in the Endpoint ID TLV. Additionally, a new Ethernet specific TLV may be introduced in the LSP_ATTRIBUTES or CALL_ATTRIBUTES object to carry the I-SID. In step 404, if the I-SID is mapped to the Short Call ID, whereby the I-SID is mapped to the 16 bit Short CALL ID field.

The present invention provides many advantages over existing systems. The present invention provides for the automatic distribution and configuration of the I-SID on BEBs supporting a particular service instance. This reduces operational complexity and decreases the possibility of misconfiguration. In addition, the present invention provides a mechanism to unambiguously partition the I-SID space. This is beneficial to avoid possible I-SID collisions when configuring the services on BEBs. I-SIDs must be globally unique in the network. Thus, I-SID collision could occur if the allocation is done independently at BEBs or when there would be I-SID space partitioning among BEBs.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of automatically configuring a Service Instance Identifier, I-SID, in a Generalized Multiprotocol Label Switching, GMPLS, controlled network, the method comprising the steps of:
    identifying a specific I-SID for a specific service in the GMPLS controlled network; and
    automatically configuring the identified I-SID within a Backbone Edge Bridge, BEB, with a Resource Reservation Protocol-Traffic Engineering, RSVP-TE, extension,
    wherein the step of automatically configuring the identified I-SID includes one of:
        carrying the I-SID in a SESSION_ATTRIBUTE object,
        mapping the I-SID to a Short Call ID field in a session object,
        carrying the I-SID in an Endpoint ID Type-Length-Value, TLV, of the session object, and
        carrying the I-SID in a new TLV in a LSP_ATTRIBUTES or CALL_ATTRIBUTES object.

2. The method according to claim 1, wherein the I-SID is concatenated to an original string within the session object, the LSP_ATTRIBUTES object, or the CALL_ATTRIBUTES object.

3. A system for automatically configuring a Service Instance Identifier, I-SID, in a Generalized Multiprotocol Label Switching, GMPLS, controlled network, the system comprising:
    a Backbone Edge Bridge, BEB, in the GMPLS controlled network;
    means adapted to identify a specific I-SID for a specific service in the GMPLS controlled network;
    means adapted to automatically configure the identified I-SID within the BEB with a Resource Reservation Protocol-Traffic Engineering, RSVP-TE, extension,
    wherein the means to automatically configure the identified I-SID includes at least one of:
        means adapted to carry the I-SID utilizing a SESSION_ATTRIBUTE object,
        means adapted to map the I-SID to a Short Call ID field in a session object,
        means adapted to carry the I-SID in an Endpoint ID Type-Length-Value, TLV, of a session object, and
        means adapted to carry the I-SID in a new TLV in a LSP_ATTRIBUTES or CALL_ATTRIBUTES object.

4. The system according to claim 3 wherein the means to automatically configure the identified I-SID includes means adapted to concatenate the I-SID to an original string within the session object, the LSP_ATTRIBUTES object, or the CALL_ATTRIBUTES object.

5. A node for automatically configuring a Service Instance Identifier, I-SID, in a Generalized Multiprotocol Label Switching, GMPLS, controlled network, the node comprising:
    means adapted to identify a specific I-SID for a specific service in the GMPLS controlled network;
    means adapted to automatically configure the identified I-SID within a BEB with a Resource Reservation Protocol-Traffic Engineering, RSVP-TE, extension,
    wherein the means to automatically configure the identified I-SID includes at least one of:
        means adapted to carry the I-SID utilizing a SESSION_ATTRIBUTE object,
        means adapted to map the I-SID to a Short Call ID field in a session object,
        means adapted to carry the I-SID in an Endpoint ID Type-Length-Value, TLV, of a session object, and
        means adapted to carry the I-SID in a new TLV in a LSP_ATTRIBUTES or CALL_ATTRIBUTES object.

6. The node according to claim 5 wherein the means to automatically configure the identified I-SID includes means adapted to concatenate the I-SID to an original string within the session object, the LSP_ATTRIBUTES object, or the CALL_ATTRIBUTES object.

7. A node for automatically configuring a Service Instance Identifier, I-SID, in a Generalized Multiprotocol Label Switching, GMPLS, controlled network, the node comprising:
    a processor; and
    a memory containing instructions that, when executed by the processor, cause the node to:
        identify a specific I-SID for a specific service in the GMPLS controlled network;
        automatically configure the identified I-SID within a BEB with a Resource Reservation Protocol-Traffic Engineering, RSVP-TE, extension,
        wherein automatically configuring the identified I-SID includes at least one of:

carrying the I-SID utilizing a SESSION_AT-TRIBUTE object, mapping the I-SID to a Short Call ID field in a session object, carrying the I-SID in an Endpoint ID Type-Length-Value, TLV, of a session object, and carrying the I-SID in a new TLV in a LSP_AT-TRIBUTES or CALL_ATTRIBUTES object.

8. A system for automatically configuring the I-SID in the GMPLS controlled network, the system comprising the node of claim 7 and further comprising:

a Backbone Edge Bridge, BEB, in the GMPLS controlled network.

* * * * *

UNITED STATES PATENT AND TRADEMARK OFFICE
CERTIFICATE OF CORRECTION

PATENT NO. : 9,325,623 B2  
APPLICATION NO. : 14/319486  
DATED : April 26, 2016  
INVENTOR(S) : Takács et al.

Page 1 of 1

It is certified that error appears in the above-identified patent and that said Letters Patent is hereby corrected as shown below:

On Title Page 2, item (56), under "OTHER PUBLICATIONS", in Column 2, Line 8, delete "Det al:" and insert -- D et al: --, therefor.

In the Drawings,

In Fig. 6, Sheet 6 of 8, delete "C-Type (Y" and insert -- C-Type (Y) --, therefor.

In the Specification,

In Column 1, Line 11, delete "2010," and insert -- 2010, now Pat. No. 8,842,667, --, therefor.

In Column 2, Line 35, delete "object" and insert -- object. --, therefor.

Signed and Sealed this
Twelfth Day of July, 2016

Michelle K. Lee
*Director of the United States Patent and Trademark Office*